United States Patent [19]

Reese

[11] 3,922,975
[45] Dec. 2, 1975

[54] METHOD AND APPARATUS FOR FEEDING SOLID WASTE TO A FLUID BED DISPOSAL APPARATUS

[75] Inventor: Richard G. Reese, Woodside, Calif.

[73] Assignee: Combustion Power Company, Inc., Menlo Park, Calif.

[22] Filed: June 24, 1974

[21] Appl. No.: 482,617

Related U.S. Application Data

[63] Continuation-in-part of Ser. No. 247,829, April 26, 1972, Pat. No. 3,818,846.

[52] U.S. Cl. .................... 110/8 F; 110/106; 241/65
[51] Int. Cl.² ......................... F23G 7/00; F23K 3/02
[58] Field of Search ............ 110/7 R, 8 R, 8 P, 8 F, 110/106; 241/48, 65, 81

[56] References Cited
UNITED STATES PATENTS

| | | | |
|---|---|---|---|
| 3,468,266 | 9/1969 | Walker, Jr. ......................... | 110/106 |
| 3,589,313 | 6/1971 | Smith, et al ............................ | 110/8 |
| 3,794,251 | 2/1974 | Williams ............................. | 241/65 |
| 3,826,208 | 7/1974 | Williams ............................ | 110/106 |

FOREIGN PATENTS OR APPLICATIONS

735,497  8/1955  United Kingdom................ 110/106

*Primary Examiner*—Kenneth W. Sprague
*Attorney, Agent, or Firm*—Limbach, Limbach & Sutton

[57] ABSTRACT

Method and apparatus are disclosed for feeding solid waste to a fluid bed disposal apparatus wherein solid waste is separated by air classification into a heavy low fuel valve fraction which is segregated from the fluid bed apparatus and a lighter particle fraction which is conveyed to an inertial separator stage via a conveying gas stream. In the inertial separation stage the lighter fraction solid waste is separated from the conveying stream and delivered to a storage area from which it is drawn and introduced via an air-lock feed valve to a fluid conduit and into the fluid bed chamber.

4 Claims, 1 Drawing Figure

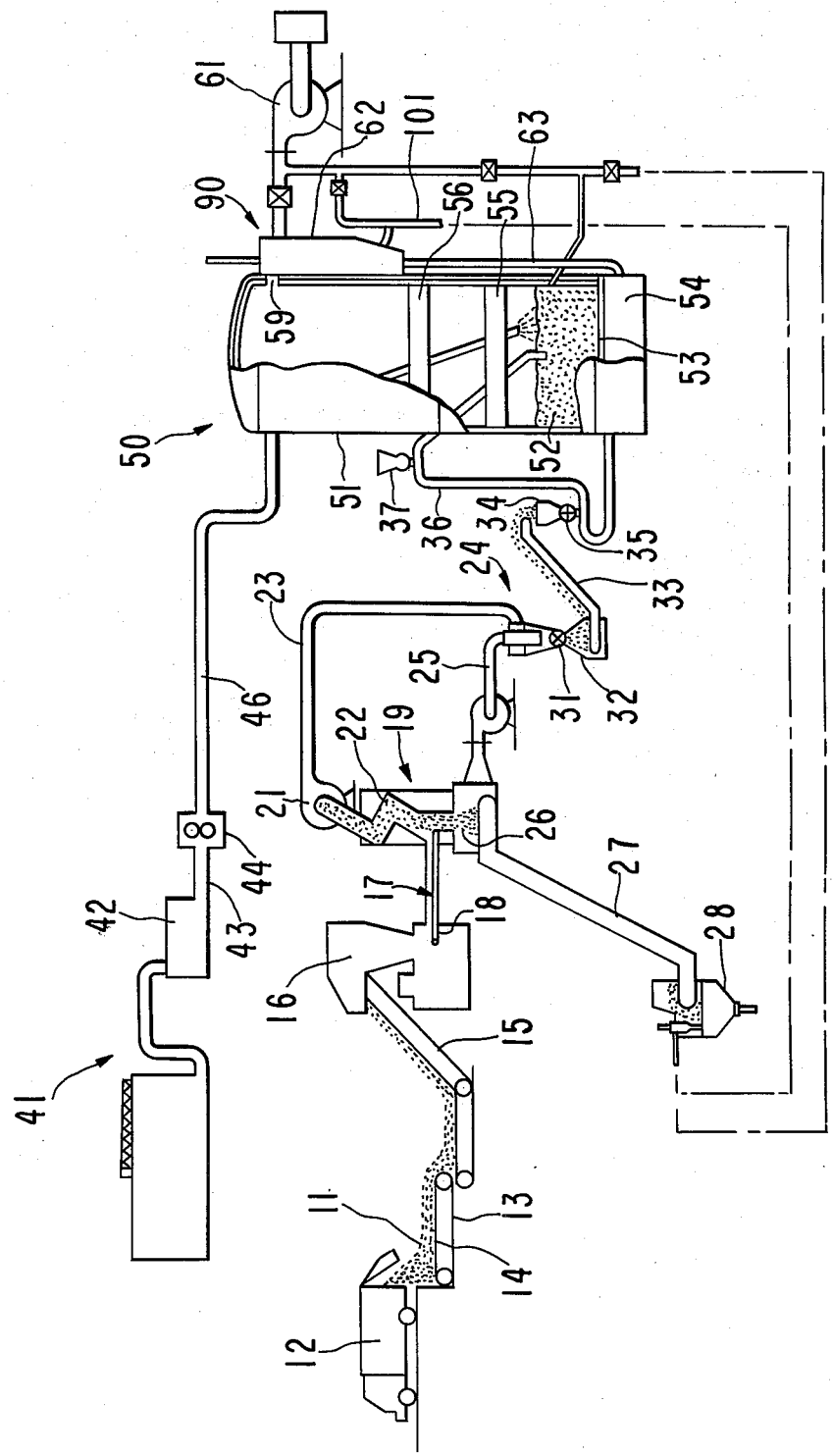
FIG. I

METHOD AND APPARATUS FOR FEEDING SOLID WASTE TO A FLUID BED DISPOSAL APPARATUS

BACKGROUND OF THE INVENTION

This application is a continuation-in-part of my co-pending application Ser. No. 247,829 filed Apr. 26, 1972, now U.S. Pat. No. 3,818,846 issued June 25, 1974, the full disclosure of which is hereby incorporated herein by reference.

Systems such as described in U.S. Pat. No. 3,589,313 to Smith et al. have been known for consuming solid waste in fluid bed reactors, and problems have existed in such systems for the proper separation and feed to the fluid bed of the most appropriate constituents of community solid waste.

The object of the present invention is to provide a novel method and apparatus for consuming solid waste using a fluid bed reactor wherein low fuel content, heavy particles are first removed from the solid waste and the high fuel content, lighter fraction particles introduced into the fluid bed reactor with minimum air turbulence and as densely as possible.

In accordance with the present invention, heavy particles are separated from the lighter particle fraction of solid waste in an air classification stage and the lighter particle fraction carried via a conveying gas to an inertial separation stage wherein the lighter particle fraction is separated from the conveying gas stream which in large part is returned to the air classification stage. The separated lighter particle fraction solid waste material is conveyed from the storage area to an air-lock feed valve into a fluid conduit for delivery into the fluid bed reactor.

These and other objects and features of this invention will become more apparent upon a perusal of the following specification taken in conjunction with the accompanying drawing.

The single FIGURE of the drawing is a side elevational schematic view illustrating the present invention.

PREFERRED EMBODIMENT

While the present invention is well suited for the pollution-free disposal of solid waste with the possible additional simultaneous disposal of various liquid materials, one configuration of the invention is useful in a municipal solid waste disposal plant wherein the solid waste can be used as a fuel to dispose of high water content municipal sewage sludge from a given population segment. Accordingly, the invention will be described with reference to such a system.

Referring now to the drawings with particular reference to FIG. 1, the combustion system includes three principal assemblies, first the waste delivery assembly 10 where solid waste material is collected, shredded and separated for introduction of the principal consumable portion into a combustion assembly, second the combustion assembly 50 wherein the solid waste is consumed and wherein the solid waste can also serve as a fuel to dispose of sewage sludge and third the combustion gas particle cleanup assembly 90 wherein entrained particles are removed from the combustion gases which are then either exhausted or conveyed on to perform work.

In the waste delivery system 10, solid waste 11 is received, typically in refuse or garbage collection trucks 12 which deliver the waste in either compacted or uncompacted form into a receiving pit 13 sized to act as a storage area so that the system can operate continuously while receiving solid waste only over a specified period of the day. From the pit 13 the waste 11 is delivered first by a pit conveyor 14 and then a shredder feed conveyor 15 into the top of a shredder 16 such as a belt-driven vertical, rotor, shredder grinder. The waste is gradually reduced in size and ejected into an exhaust chute 17 where it is conveyed with the aid of a conveyor 18 to an air classifier 19.

The effluent from the shredder 16 is a homogeneous mixture with particle size depending upon the shredder setting and the feed rate, varying from a very fine to 1 inch by 2 inch and larger. The steel and other ductile metal is in small balls with some coinage. Wood is toothpick to pencil size. The more flexible material, such as soft plastic and soft material such as rubber, are the largest particles.

High density, non-combustible particles coming out of the shredder 16 are removed from the process by the air classifier 19. This is done primarily to protect subsequent feed processes since the material removed has little heating value and hence would be little altered in volume or weight by the combustion process. Also, the air classifier provides a means for separating the reclaimable metal, glass, etc. for recycling to the appropriate industries for reuse if desired.

In the air classifier 19 a large blower 21 is used to suck the refuse up through an inclined treacherous path 22 and out through a tube 23 to a velocity reducer/solid waste accumulator system in the form of a cyclone inertial separator 24. The exhaust stack 25 of the inertial separator 24 containing the major portion of the air used during the air classifying cycle returns this air to the lower inlet of the air classifier 19.

The size of the heavy particles that are dropped out by the air classifier 19 can be regulated by adjustment of the velocity of air going through the system. The air classifier/solid waste feed subsystem is a completely enclosed system with the result that all odors, dust and potential pollution problems are completely contained.

The heavy non-combustible reject material 26 from the air classifier 19 is carried via a conveyor 27 to a residue storage bin 28 from which it can be disposed of periodically by land fill or ultimately by further reclamation of some or all of the materials contained in the residue.

The light particle fraction of the solid waste which has been carried from the air classifier 19 via conduit 23 to the inertial separator 24 drops preferably into a mulcher 31 which breaks apart any clods, chunks or large pieces that may have passed the shredder 16 or formed after shredding. This mulcher and mulching process eliminate possible clogging in pneumatic feed portions of the rest of the system.

From the mulcher 31 the solid waste drops into a storage accumulator 32 which serves as a reservoir to smooth out the flow of solid waste. From the storage bin 32 the solid waste is carried such as via a conveyor 33 into a hopper 34 for introduction into the entrance of an air-lock feed valve 35.

The air-lock feed valve 35 introduces the solid waste into a fluid conduit 36 where the material is pneumatically conveyed into the fluid bed to be described below.

A bed additive feed system 37 is provided for automatically feeding, upon demand, fresh limestone or other bed additive chemical reactive materials to the fluidized bed during operation. These additives react with the corrosive or other pollutant gases or materials within the bed and reduce or prevent noxious fumes from escaping to the atmosphere.

Where the combustion system also serves to consume liquid waste from a sewage treatment plant 41, sludge from sludge storage tanks 42 is removed via one or more pipes 43 to one or more sludge pumps 44 and via one or more pipes 45 to the combustion chamber where it is injected as a spray on top of the bed of granular material or injected above or below secondary beds in the combustion system.

It has been discovered that with the waste delivery assembly 10 the air volume reducing cyclone inertial separator 24 reduces the volume of air from the air classifier 19 to the air-lock feed valve 35 so that solid waste is fed through valve 35 with minimum turbulence and as dense as possible while the inertial separator 24 and storage bin 32 act as a plenum or reservoir to smooth out the flow of solid waste.

In the combustion assembly 50 a hollow, cylindrical combustion chamber 51 is provided to contain a bed of granular material 52 which, when not being fluidized, is supported on a distributor plate 53 which provides even distribution of air across the bottom of the bed from a plenum chamber 54 therebelow.

Positioned within the combustion housing 51 above the fluid bed are a lower secondary bed/elutriation arrestor 55 and then upper secondary bed/elutriation arrestor 56, each to provide an obstruction of labyrinth construction.

Exhaust gases from the combustion chamber 51 are conveyed out of a number of exhaust ports 59 below a cover over the top of chamber 51 and passed through the gas particle cleanup assembly typically incorporating inertial separators for separation and return of granular material carried out of the bed with the exhaust gases for later return to the bed.

Combustion air is directed to the combustion chamber from a blower 61, through a housing 62, surrounding the inertial separators for heat exchange to heat up the blower air and delivery via a conduit 63 to the plenum 54.

The fluidizing air is caused to flow through the bed material particles under carefully controlled conditions, chief among these conditions being the requirement that the air velocity through the bed, and hence the pressure drop, be greater than the value required to support the bed weight and less than the value required to sweep the particles out of the bed. In addition, the bed must consist of particles within a suitable range of size, shape and density. When these conditions are all satisfied, the stationary bed of particles will have expanded and the bed particles will exist in a fluidized state. If the movement of one specific particle could be observed, it would be seen to undergo a continuous, turbulent motion and would wander throughout the bed in a random manner. Viewed as a whole, the dynamic condition of the fluidized bed resembles a tank of boiling water in the sense that there is considerable turbulence and bursting of bubbles at the surface. It is this dynamic characteristic which imparts to a fluidized bed its unique advantages.

The inert or chemically reactive bed materials used with the fluid bed combustor are chosen to withstand the combustion temperatures without melting or slagging. The specific bed materials selected can fall within a wide variety of inert particles, ranging from the inexpensive silica "beach" sand to the more exotic ceramic materials (usually alumina or silicon carbide) and to chemically reactive materials such as ground limestone, dolomite and others. The bed material is preheated to a predetermined temperature and then fluidized for injection and combustion of the solid waste material.

What is claimed is:

1. In a waste disposal apparatus for consuming solid waste with minimal residue including a combustion housing, a bed of granular material, means for supporting the bed of granular material within the housing, means for providing combustion air to the bottom of the bed for maintaining the granular material in a fluidized state, and means for separating heavy particles out from a stream of solid waste material and feeding the remaining light particle fraction in a conveying gas stream to the combustion chamber, the improvement comprising:
   fluid conduit means for carrying solid waste into the combustion housing,
   air-lock feed valve means connected to said conduit means for introducing solid waste into said conduit means,
   storage means for receiving and storing the separated light particle fraction of solid waste material,
   conveyor means for conveying solid waste from said storage means to said air lock feed valve means,
   inertial separator means for separating the light particle fraction of the solid waste from the conveying gas stream for delivery to said storage means, and
   means for returning the conveying gas separated from said particle fraction to the separation means.

2. The method of feeding solid waste to a fluid bed disposal apparatus comprising the steps of:
   separating heavy particles of solid waste from a remaining light particle fraction by air classification,
   delivering the separated light particle fraction to an inertial separation stage in a conveying gas stream,
   separating the remaining light particle fraction from the conveying gas stream in an inertial separation stage,
   delivering the separated light particle fraction from the inertial separation stage to a storage area,
   conveying solid waste material from the storage area to an air-lock feed stage,
   passing said solid waste through an air-lock feed into a conduit for introduction into a fluid bed combustion housing, and
   mulching the solid waste output of the inertial separation stage for direction to the storage area.

3. The method of feeding solid waste to a fluid bed disposal apparatus comprising the steps of:
   separating heavy particles of solid waste from a remaining light particle fraction by air classification,
   delivering the separated light particle fraction to an inertial separation stage in a conveying gas stream,
   separating the remaining light particle fraction from the conveying gas stream in an inertial separation stage,
   delivering the separated light particle fraction from the inertial separation stage to a storage area,
   conveying solid waste material from the storage area to an air-lock feed stage,
   passing said solid waste through an air-lock feed into a conduit for introduction into a fluid bed combustion housing, and returning the separated conveying gas from the inertial separation stage to the air classification stage to serve as the conveying gas stream.

4. A waste disposal apparatus for consuming solid waste with minimal residue comprising:
   a combustion housing;
   a bed of granular material;
   means for supporting the bed of granular material within the housing;
   means for providing combustion air to the bottom of the bed for maintaining the granular material in a fluidized state, and
   means for feeding solid waste into said bed of granular material including
   fluid conduit means for carrying solid waste into the combustion housing,
   air-lock feed valve means connected to said conduit means for introducing solid waste into said conduit means,
   storage means for receiving and storing the separated light particle fraction of solid waste material,
   conveyor means for conveying solid waste from said storage means to said air-lock feed valve means,
   inertial separator means for separating the light particle fraction of the solid waste from a conveying gas stream for delivery to said storage means,
   air classifier means for separating heavy particles of low fuel value out from a stream of solid waste material, and
   means for returning to said air classifier means the conveying gas separated from said particle fraction in said inertial separator means.

\* \* \* \* \*